United States Patent [19]
Bhat

[11] Patent Number: 6,061,442
[45] Date of Patent: May 9, 2000

[54] METHOD AND APPARATUS FOR IMPROVED CALL CONTROL SCHEDULING IN A DISTRIBUTED SYSTEM WITH DISSIMILAR CALL PROCESSORS

[75] Inventor: Kabekode Venkata Bhat, Naperville, Ill.

[73] Assignee: Lucent Technologies Inc., Murray Hill, N.J.

[21] Appl. No.: 08/813,532

[22] Filed: Mar. 7, 1997

[51] Int. Cl.[7] .................................................. H04M 3/00
[52] U.S. Cl. ......................... 379/269; 379/265; 379/266; 370/229
[58] Field of Search .................... 379/268, 269, 379/242, 243, 244, 112, 113; 370/229, 230, 231, 232, 233; 395/682, 672, 673, 674, 675

[56] References Cited

U.S. PATENT DOCUMENTS

| | | | |
|---|---|---|---|
| 4,827,499 | 5/1989 | Warty et al. | 379/58 |
| 4,974,256 | 11/1990 | Cyr et al. | 379/113 |
| 5,311,572 | 5/1994 | Friedes et al. | 379/207 |
| 5,416,833 | 5/1995 | Harper et al. | 379/201 |
| 5,452,350 | 9/1995 | Reynolds et al. | 379/113 |
| 5,764,750 | 6/1998 | Chau et al. | 379/268 |
| 5,781,861 | 7/1998 | Kang et al. | 370/332 |

FOREIGN PATENT DOCUMENTS 44 44 156   6/1995   Germany.

OTHER PUBLICATIONS

U. Korner et al., "Overload Control in Communications Networks", Globecom '91, Pheonix, Dec. 2–5, 1991, pp. 1331–1335.

K. J. Lee, "Database Query Scheduling in Common Channel Signaling Network", IEEE Infocom '88, New Orleans, LA, Mar. 27–31, 1988, pp. 976–985.

*Primary Examiner*—Scott Wolinsky
*Attorney, Agent, or Firm*—Jack R. Penrod

[57] ABSTRACT

A call scheduling and assignment method and apparatus that schedules each call request on an application processor of a multiple processor system that will process the call request in the smallest amount of time. This method and apparatus then places response time as the important criterion over equal utilization of application processors in a multiple processor system. This method and apparatus recognizes that some application processors are able to respond faster than others, even when operating at the same or higher call load as other processors in the system. For such very common situations, the faster processors can and should be allowed to process a proportionally greater amount of the call processing load. By doing so, the calling customer receives a shorter wait and the system owner receives more call revenue for the same system equipment.

8 Claims, 6 Drawing Sheets

METHOD AND APPARATUS FOR IMPROVED CALL CONTROL SCHEDULING IN A DISTRIBUTED SYSTEM WITH DISSIMILAR CALL PROCESSORS

TECHNICAL FIELD

The invention relates to apparatus and method for controlling communications in a telecommunication switching system and more particularly to an apparatus and method for distributed processing control of such systems having dissimilar call processors.

DESCRIPTION OF THE PRIOR ART

A common network has application processors (APs) in which not all of the processors have the same performance characteristics and yet each of the processors processing an independent application is required to respond within a definite maximum time limit. One problem of significant interest in these systems is that of deciding which AP must be assigned to process a next call requesting service. Such situations arise in the computer and communication arena where the network owners expand their system cost effectively by adding newer, higher performance APs to meet the ever increasing customer needs for digital processing and call processing (CP) while protecting their investments in existing systems. In order to meet the growing customer CP needs cost effectively, cheaper APs featuring faster hardware, newer software, newer middleware and newest standards have historically been provided by progressing technology. For example, CP is a central function in the next generation call control systems such as system 100 and system 200 shown respectively in FIGS. 1 and 2. In the system 100 shown in FIG. 1, APs $102_1$–$102_n$ are interconnected by a fast token ring 104. In the system 200 shown in FIG. 2 the APs $202_1$–$202_m$ are connected by ATM-1 and ATM-2. In system 100 and system 200 network switch-1 and network switch-2 are connected by optical carrier level 3 (OC-3) links, which communicates at 155.52 megabits per second, to asynchronous transfer mode units ATM-1 and ATM-2. Further, each of the APs $102_1$–$102_n$ or $202_1$–$202_m$ have replicated data bases, and are functionally equipped to handle any call. The APs must respond to a CP request within a specified period to prevent the following problems: calls will not be setup or torn down as expected by the customers leading to customer dissatisfaction and some calls during busy hour may not be completed leading to loss of revenue for the service provider.

The problem may also arise in automatic call distribution in a distributed call center application where the next call needs to be assigned to one of the diverse call processors that share a database (replicated or networked).

Prior attempts to solve this problem were based on heuristics. For example, in the method by Warty et.al, U.S. Pat. No. 4,827,499, the fraction of new load allocated to each processor was determined first by initialization parameters that were subject to modification when an AP became overloaded. System overload was recognized when the fraction of individual overloaded processors exceeded a threshold. Then the percentage of new calls rejected were gradually increased until system was no longer in overload and decreased in the same way otherwise. Cyr et al, U.S. Pat. No. 4,974,256, indicate that the response time to system overload was less than optimum in this method and proposed an improvement. In this method, the fraction of new calls allocated to each AP during the next period is adjusted heuristically with a view to equalize the occupancy of all APs during that period by measuring the average utilization of each AP periodically. The scheduler reduces that fraction for APs whose occupancy exceeds the average and increases the fraction for APs whose occupancy is below the average. It uses either the average utilization of all APs or system wide loss of calls in a period to recognize system overload and prescribes a fixed percentage of calls to be shed, i.e. canceled, for a future period by all APs to get out of the perceived overload. Depending upon the chosen parameter values, the method can be either pessimistic (support less than optimal system through put) or result in potentially avoidable loss of calls during busy hours. However, these methods do not address each call request on a real time basis or deal with the response time performance capabilities of diverse APs, and have limited predictive capability to prevent disruption to existing calls. Thus, a slow AP may get overloaded, trigger shedding of a percentage of calls from all APs of the system in the next period. During busy hours, calls will be lost by such a method.

It is an object of the present invention to provide a method that utilizes each AP of a system having dissimilar APs to its fullest.

It is another object of the present invention to provide a method that utilizes the quick response time of the faster APs first and then the slower APs in order to maximize the number of CPs processed.

It is another object of the present invention to provide a method that will not shed calls during heavy call traffic times when there is still capacity on an AP of the system to process the next CP request.

SUMMARY OF THE INVENTION

The new method certainly helps processing more calls during busy hour than the AP utilization equalization method for systems with APs with different performance characteristics. Such APs are realities that our customers will be living with in order to protect their investments. With the existing methods that focus on processor occupancy equalization, faster processors will be underutilized and system capacity will suffer since it allows for the possibility of the handicap of the lowest speed AP dictate the under utilization of faster APs and forced load shed by high speed APs.

A method for directed call control scheduling in a distributed system with a plurality of application call processors which includes the steps of: determining if a call request is present and if there is not a call request present repeating this call request determining step after a short delay, otherwise continuing; determining if an application processor of the plurality of application processors has been assigned to the call request and if an application processor has been assigned to the call request then terminating the call request, updating data table entries and returning to the call request determining step otherwise continuing. The next step is using a computed response time data T(i) with data of S(i) and U(i) finding one application processor of said plurality of application processors that has a least response time T(j) to fulfill the determined call request. Then the subsequent step is determining if the least response time of the application processor T(j) is greater than τ and if T(j) is greater than τ shedding said call request and returning to the call request determining step, otherwise continuing. The next step is updating expected utilization of U(j) and assigning said call request to j-th application processor for call processing and returning to the call request determining step with the expected utilization updated.

DETAILED DESCRIPTION

Figure 1:
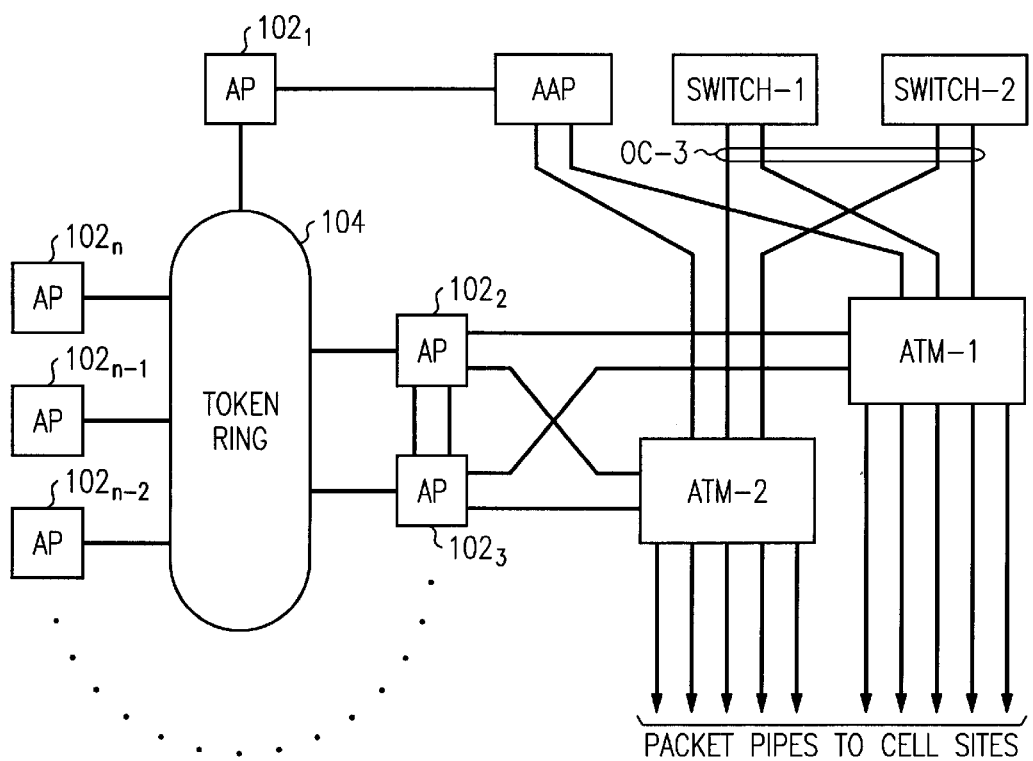
FIG. 1 is a block diagram of a known system having a token ring with a number of non-homogeneous APs.
Figure 3:
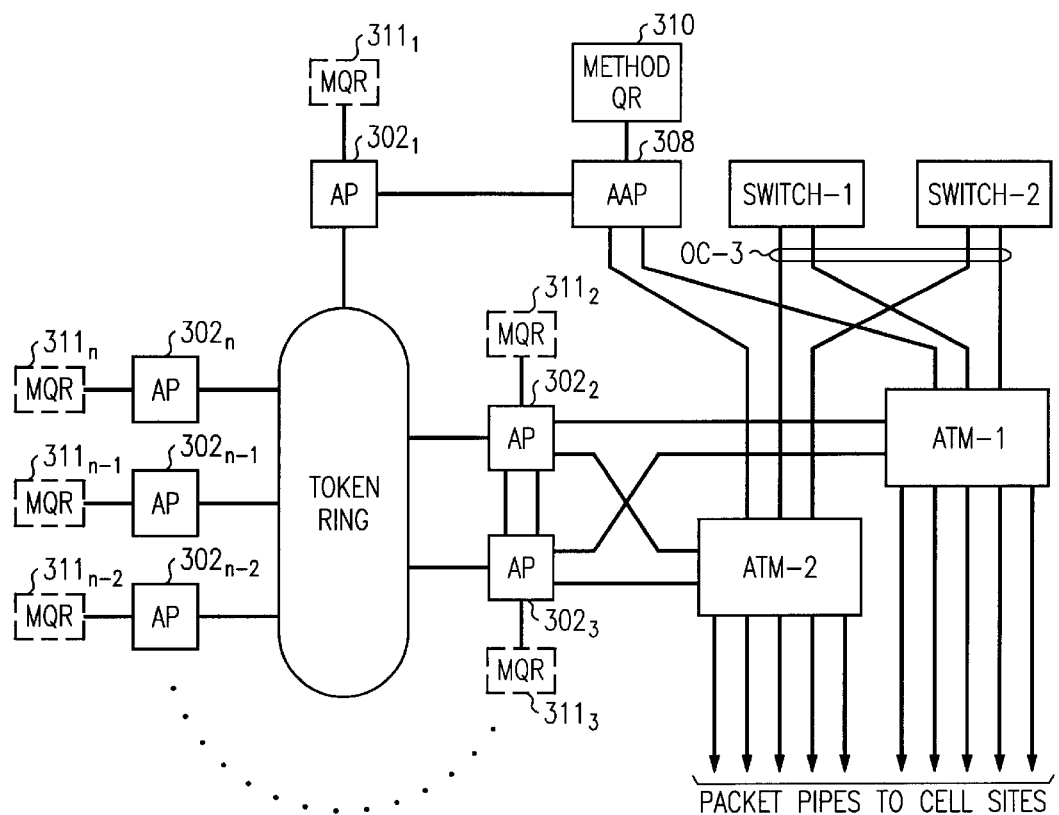
FIG. 3 is a block diagram of a system according to the present invention having a token ring with a number of non-homogeneous APs.

Referring now to FIG. 3, a ring system 300, which has a number of APs $302_1$–$302_n$, is shown in block diagram form. System 300 depicted in FIG. 3 is essentially the same as system 100 depicted in FIG. 1 except that a method QR for CP is different. QR is an abbreviation of quick response, the reason quick response is of interest will become apparent later. A program which when executed provides the method QR for CP is stored in a memory 310 that is connected to an administrative application processor (AAP) 308.

AAP 308 then executes the program to provide method QR for CP for the system 300. An alternative embodiment has a program which when executed provides the method QR that is stored in a set of memories $311_1$–$311_n$ for CP. Each of the memories $311_1$–$311_n$ is connected to a respective one of the application processors $302_1$–$302_n$. This alternative embodiment uses distributed processing among the application processors $302_1$–$302_n$ to provide the method QR. The memories $311_1$–$311_n$ are shown as blocks with dashed lines around their perimeters as an indication that they represent an alternative embodiment of the system 300. Either of these embodiments will provide system 300 with the advantages of method QR for CP over the equal utilization method for CP used in the ring system 100 shown in FIG. 1.

Figure 2:
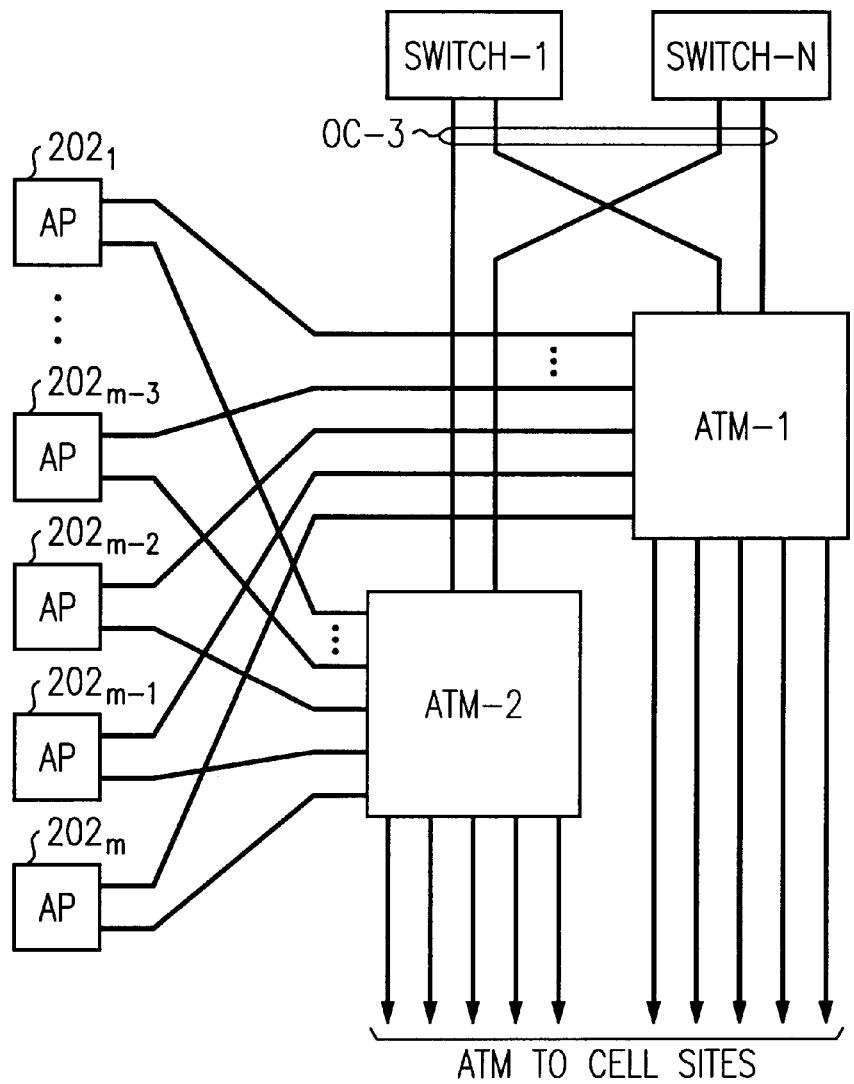
FIG. 2 is a block diagram of a known system having a set of call processing APs connected by an ATM network.
Figure 4:
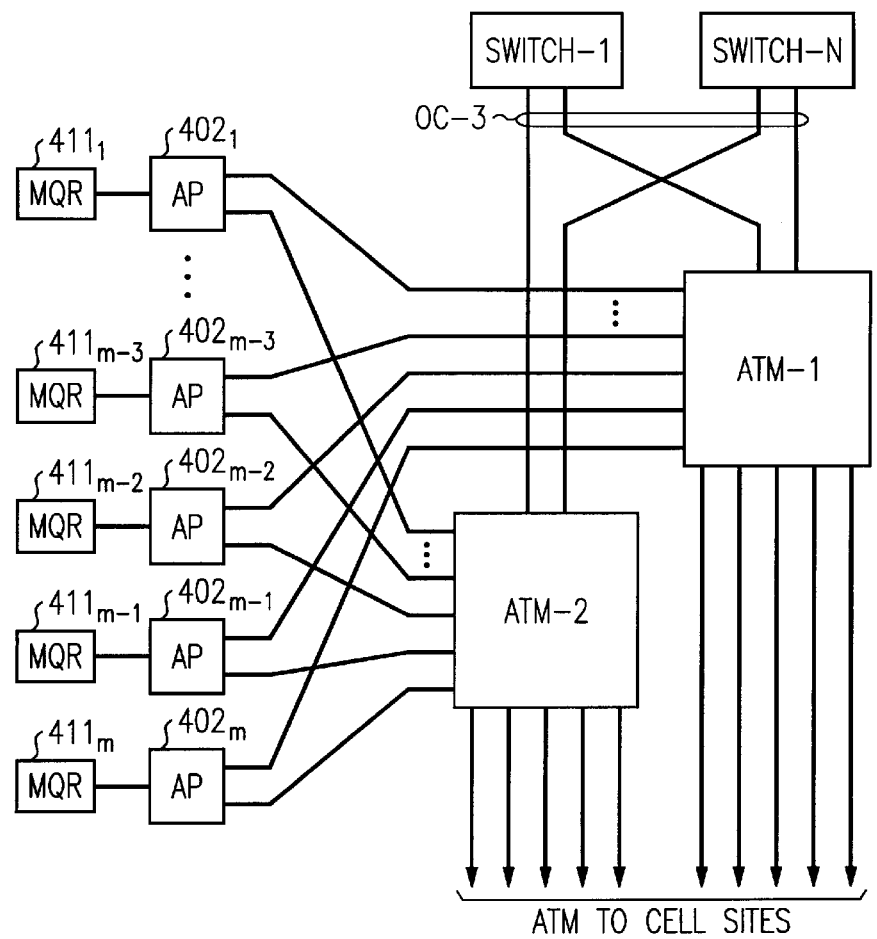
FIG. 4 is a block diagram of a system having a set of call processing APs connected by an ATM network.

Similarly, with reference now to FIG. 4, an ATM connected system, which has a number of APs $402_1$–$402_m$ that are used for CP for the system 400, is shown in block diagram form. System 400 depicted in FIG. 4 is essentially the same as system 200 depicted in FIG. 2 except that it uses the method QR for CP. A program which when executed provides the method QR for CP is stored in a set of memories $411_1$–$411_m$ for CP. Each of the memories $411_1$–$411^m$ is connected to a respective one of the application processors $402_1$–$402_m$. This embodiment uses distributed processing among the application processors $402_1$–$402_m$ to provide the method QR for system 400. This embodiment will provide system 400 with the advantages of method QR for CP over the equal utilization method for CP used in the ATM system 200 shown in FIG. 2.

The method QR itself gains its advantage by using a quick response to each call processing request to either of the system 300 or 400. As an explanation of the operation of method QR, consider that $\{P_i | i=1,2,3, \ldots q\}$ is a set of q APs that constitute a distributed processing system where $P_i$ denotes the i-th AP. $P_i$ has a total processing service time $S_i$ (in seconds) for a specific CP request R. The parameter q is equal to n for system 300 and m for system 400, The utilization (or occupancy) of $P_i$ is directly proportional to the number of concurrent CP control tasks it handles in a second. Associated with the request R, there is a response time cut off $T_r$ (in seconds) imposed by external considerations including customer preference. If $P_i$ fails to complete processing the request within $T_r$, the call is assumed to fail. Let p seconds be the mean length of a call. Typically, under normal operation, a call control assigned to a particular AP is processed by it for the entire life of p seconds of the call. Should the AP fail, the system assigns the responsibility to another AP. The purpose of method QR is to assign a call processing request as it arrives to an AP that has the highest promise of completing the task in least delay (when feasible).

If $U_i$ denotes the current utilization of $P_i$ while processing $C_i$ calls per second. Note that the AP $P_i$ is a stored program computer and its response time or latency $L_i$ (in seconds) is modeled by a M/M/1 queuing model as follows.

$$L_i = \frac{S_i}{(1 - U_i)}$$

Where, $$U_i = C_i \times S_i$$

Response time of an AP is better if it is smaller, that is a given in this technology. Note that the service time for a call on an AP is a good indicator of the performance potential of the AP. The response time of an AP is a true indicator of actual performance of the AP on the job. Response time depends upon both service time and utilization as given in the latency expression above. Other things remaining the same, it must be noted that the faster the clock rate of an AP, the lesser will be the service time for a request and the smaller will be the response time for the call request (assuming same processor utilization). What is not a given in this technology is the following.

Other conditions remaining the same, the AP with a faster processor with utilization $U_f$ has better response time than the AP with a slower processor with the utilization $U_l$, $U_l < U_f$ if $$\frac{S_l}{(1 - U_l)} > \frac{S_f}{(1 - U_f)}, \text{ or}$$

$$\frac{S_l}{S_f} > \frac{(1 - U_l)}{(1 - U_f)}$$

Now if $S_l/S_f$ were 10 (because the clock rate of the high speed processor is 10 times that of the lower speed one), even if the lower speed processor is utilized only 10% as compared to the 90% utilized high speed AP, the high speed AP gives better request response time than the lower speed one.

Restated, this means that the known call distribution method that attempts to equalize utilization of all APs may provide slower response to some call requests processed by the slower AP. In the worst case, it can lead to intolerable delays at the lower speed APs during busy hours and loss of calls. In the method QR a new call request is assigned to the AP (or one of equivalent APs if there are more than one that can perform identically) that has the performance capability to respond quicker than other APs of the system 300 or 400 and completes the tasks within the deadline even if the assigned AP with the faster processor is highly utilized. Some of the advantages of method QR over the previously known methods are:

1. During low and medium load (not-busy hours), it responds predictably faster than the previously known methods.

2. During busy hours, the method QR handles more calls than the methods based on utilization equalization method. The extra number of calls that may be supported because of the method according to the present invention depends upon the system parameters.

The method QR according to one embodiment of the present invention runs on AAP 308 that maintains a data structure that has relevant performance information on each AP $302_1$–$302_n$ within the system 300. The information on each AP include its current utilization and its service time (seconds) for processing a typical CP request. The former is either monitored and collected periodically from all APs or predicted based on a performance model. The service time for a CP request on a specific $AP_i$ is a constant that includes a sum of all its time used for processing messages, accessing databases and other tasks such as call set up, tear down and other functions. The average CP service time on a specific $AP_i$ is predetermined by a one time laboratory measurement on a lightly loaded AP and it is initialized at boot-up time of the system. From these and the CP performance model, the AAP 308 predicts the response time of each of the APs $302_1$–$302_n$ as if it were to process the request and identifies the AP that promises the lowest response time for the CP request. If in the event the response time of the selected AP were beyond the acceptable threshold τ seconds, the call is shed, i.e. canceled, as none of the remaining APs of the system 300 can do any better. Otherwise, the call is assigned to the selected AP and its predicted utilization is updated. The AAP 308 also maintains Lst, a list of all current assignments given by the ordered pair (call_, AP assigned to process the call defined by call_) being processed by the entire system 300. AAP 308 uses this list to test if a request is from a new call_or from existing one.

The other embodiment of system 300 and the system 400 operate in the same way as the embodiment of system 300 having the AAP 308, except that the call processing management and assignment functions of the AAP 308 are included and distributed among the APs $302_1$–$302_n$ for the other embodiment of system 300 and among APs $402_1$–$402_m$ for system 400.

Figure 5:
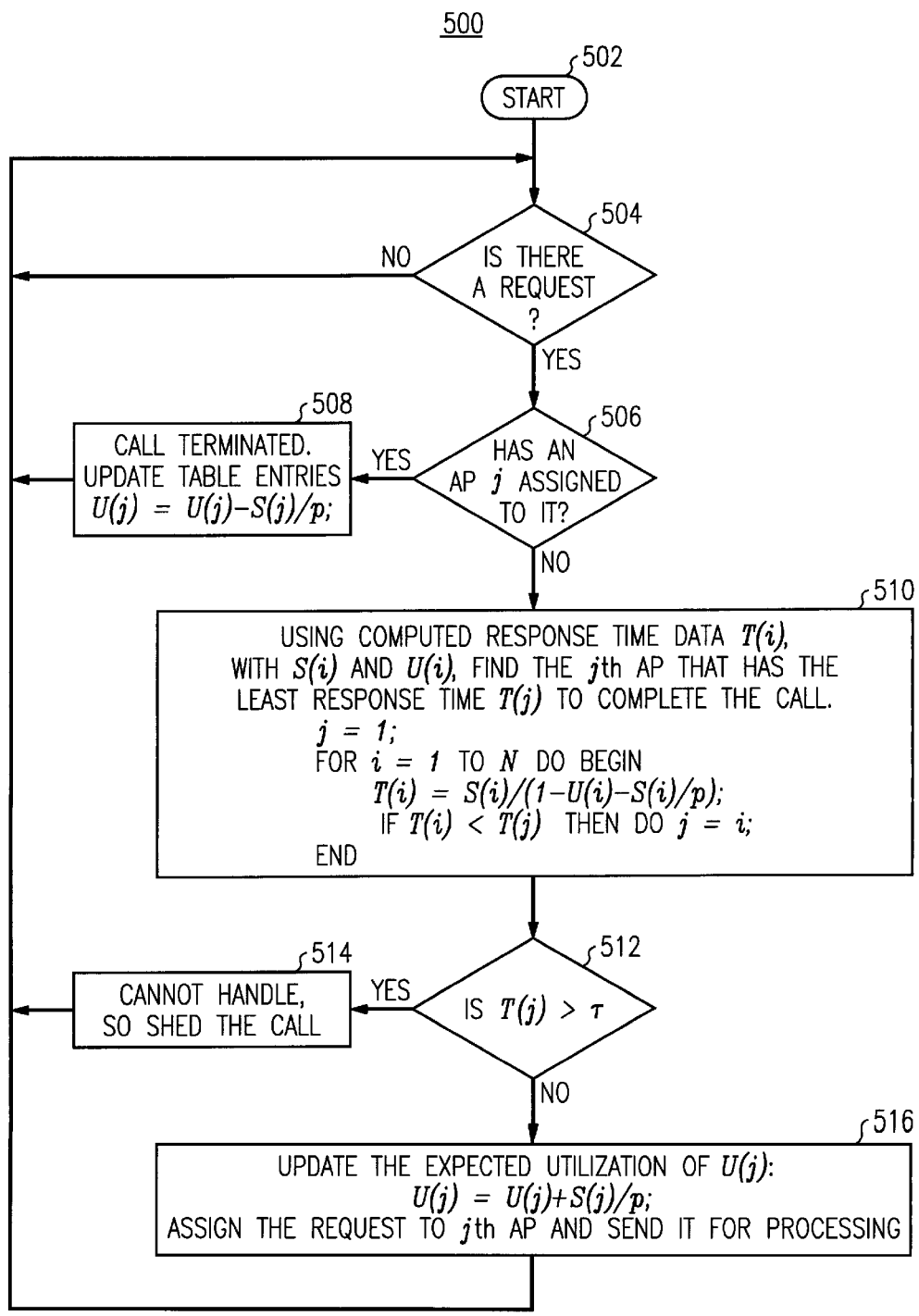
FIG. 5 is a flow chart for the QR method for call control scheduling.

The following is a formal statement of method QR 500 (method QR is also depicted in a flowchart of FIG. 5) where i, j, k ,and N are all integers, T(i), U(i), S(i) are i-th entry in the respective N vectors maintained by AAP.

---

Method QR
    Procedure Wait ( )\* The AAP process waits for the next CP request
        Do while(true)
            If there is a request then do begin
            If it is for a call
            assigned to the k-th AP then do task(k)\* Send to
owner of the call.
                Else do Schedule 0
            End
        End
End
Procedure Schedule( )
j=1;
For i = 1,
2, . . . N do begin\* For the request type determine the AP that has the least response time
T(i) = S(i)/(1−U(i)−S(i)/p)\* Find a j such that (T)j is minimum of {T(i)| i=1,2, . . . N}
    If T(i) < T(j) then do j =i;
    End
    If T(j) > τ then do begin
    give a busy tone; \* Unacceptable delay, therefore shed the call
    Wait( )
    End -continued Else do begin
    U(j) = U(j) + S(j)/p;\* Update the utilization of j-th AP;
    Include (call_id,j) pair in the list of assignments;
    Send the request to the j-th AP for CP;
    End
End
Procedure task (k)
    If call completed or failed then do U(k) = U(k)−S(k)/p;\* Reduce the utilization tor call completion.
        Remove the (call_id,k) entry from the Lst;
    End
End

---

Method 500, which is useful in a distributed system having multiple application call processors with different call processing capabilities, is a method for directed call control scheduling among the multiple processors. Method QR 500 starts at step 502 and progresses to decision 504. Decision 504 determines if a call request is present and if a call request is not present, decision 504 self loops to repeat decision 504 until a call request is received, then the method QR 500 progresses to decision 506. Decision 506 determines if an application processor of the multiple of application processors has been assigned to the call request and if an application processor has been assigned to the call request then progressing to step 508, otherwise proceeding to step 510. Step 508 terminates the call request because it has been assigned to processor and goes on to updates application call processor utilization data table entries before returning to step 504. Step 510 finds one application processor that has the smaller or smallest response time of the multiple application processors that can fulfill the call request. In order to find the smaller response time, step 510 uses a computed response time data) T(i) for each application call processor of class i with performance data of S(i) of each application call processor in class i and utilization data U(i) finding one application processor that has a smaller response time T(j) of the plurality of application processors to fulfill the call request. After step 510, the method QR 500 progresses to decision 512. Decision 512 determines if the response time T(j) is greater than the maximum allowable response time τ and if the response time T(j) is greater than maximum allowable response time τ processing to step 514, otherwise progressing to step 516. At Step 514, the method QR 500 sheds the call request because it cannot be processed within the maximum allowable time, after which method QR 500 returns to step 504. At step 516, method QR 500 updates expected utilization of U(j) of the j-th application processor for call processing and assigns this call request to j-th application processor for call processing. After step 516, like step 514, method QR 500 returns to step 504 to process another call request. Method QR 500 is set up to continuously process incoming call requests to a telecommunications network, so a continuous loop method is appropriate.

The Method QR 500 works correctly and efficiently. The method QR 500 updates and keeps track of the utilization of each processors in vector U and the service time for all processors in vector S. Note that the expected reduction in k-th AP utilization U(k) by a completion of a call is S(k)/p where p is the mean call length in seconds. Similarly, the expected increase in j-th AP utilization U(j) by a new a call request is S(j)/p where p is the mean call length in seconds. When a new call request arrives (or a call gets completed), the number of calls per second increases (or decreases exactly by 1/p. Thus method QR correctly implements the model given in the expressions for latency $L_i$ and the utilization $U_i$ presented previously dynamically on a call by call basis.

Once these information are available, predicting the response time requires only a division of the service time, a known constant initialized at the boot time by (1- the utilization). All that is needed is a couple of vectors of dimension N, one for utilization and the other for service time. The list Lst needs to be of the order of the number of calls per second. Testing if a call is new will require a scan of the list Lst which can be done in constant time. The complexity of our method is O(N) and is linear in terms of the number of APs, and the method is efficient.

For further advantages of the method QR, consider the following notations and definitions. The set of processors within the system are assumed to be partitioned so that each class has the same processor speed and performance characteristics. Further the classes are assumed to be ordered from 1 to k where processors in the first class are the slowest and the processors in the k-th class are the fastest and for all 0<i<k, the processors in class i+1 are faster than those in class i. The major notations used are as given in Table 1.

TABLE 1

Notations used

| Notation | Description |
| --- | --- |
| $n_i$ | Number of processor in class i |
| $c_i$ | Call capacity of an AP in class i in number of calls per second |
| $s_i$ | Speed (performance) of a processor in class i |
| $U_i$ | Utilization of an AP in class i as a fraction. |
| t | Call service time in seconds for a fastest AP |
| τ | Response time in seconds for a fastest AP in the QR method |
| T | Response time for the slowest AP in utilization equalization method |
| V | Utilization of an AP in equalization method before loss of a call |

The purpose of APs in both the utilization equalization method and the method QR is to provide call processing. For analysis, it is assumed that all calls have more or less the same call control procedures. On that basis, the call distribution tree can be used to modify the model and method QR to further improve results. If an AP does other processing functions also, its performance can be de-rated to account for processing those functions. A CP scheduling method is said to fail when an AP fails to complete processing within a given dead line or time period. Note that if a processor that does call control at any time fails to respond with the right information/signals within a reasonable amount of time (that is predetermined) calls being processed by it may not be set up or torn down in time or may not be accounted for and could be dropped. In view of this, the following conclusions can be made:

Conclusion 1

The utilization equalization method fails when all the utilization of all processors is V and the response time of the slowest processor exceeds T.

Conclusion 2

The method QR fails when the response time of any processor exceeds τ. (and the utilization of a faster processor will always be larger than a slower one).

The call capacity of an AP is given by the maximum number of calls per second the AP can concurrently handle without dropping any calls. Thus an AP that is processing number of calls per second that is less than its call capacity, can guarantee that its response time will be within the acceptable cut-off.

Number of Calls Processed Per Second in Utilization Equalization Method

With the utilization equalization method, the processor utilization is the same as V and it will process maximum number of calls $C_1$ in an AP that is slowest when the following is true.

$$T_1 = \frac{t \times \frac{s_k}{s_1}}{1 - C_1 \times t \times \frac{s_k}{s_1}}$$

where $$U = C_1 \times t \times \frac{s_k}{s_1}$$

and t is the service time for processing the call on the fastest processor. Thus $$C_1 = \frac{s_1}{t \times s_k} - \frac{1}{T_1}$$

Since utilization of all APs in this method is U, it can be shown that for $1 \leq i \leq k$ the following is true:

$$C_i = \frac{s_i}{t \times s_k} - \frac{1}{T_i}$$

Thus the total number of calls processed by the known method before any failure of a call is given by:

$$C_{existing} = \sum_{i=1}^{k} \left( \frac{s_i}{t \times s_k} - \frac{1}{T_i} \right) \times n_i$$

Number of Calls Processed Per Second by the Method QR

The number of calls processed by an AP in class k is determined by the following:

$$\tau = \frac{t}{1 - C'_k \times t}$$

and $$C'_k = \frac{1}{t} - \frac{1}{\tau}.$$

The number of calls processed by an AP in class i is given by the following equation.

$$C'_i = \frac{s_i}{t \times s_k} - \frac{1}{\tau}$$

Thus the total number of calls processed by the method QR before a call failure occurs is given by:

$$C_{new} = \sum_{i=1}^{k}\left(\frac{s_i}{t \times s_k} - \frac{1}{\tau}\right) \times n_i$$

The extra number of calls per second the same system can process without failing using the method QR is given by:

$$C_x = C_{new} - C_{existing} = \sum_{i=1}^{k}\left(\frac{1}{T_i} - \frac{1}{\tau}\right) \times n_i$$

Note that $T_1=\tau$, because at this delay, lowest speed AP has the highest allowable delay possible in the AP utilization equalization method. However for the same utilization, in the utilization equalization method becomes:

$$T_i = T_1 \times s_1/s_i = \tau \times s_1/s_i \text{ for } 1 \le i \le k.$$

Thus:

$$C_x = \sum_{i=1}^{k}\left(\frac{s_i}{s_1} - 1\right) \times \frac{n_i}{\tau} = \sum_{i=2}^{k}\left(\frac{s_i}{s_1} - 1\right) \times \frac{n_i}{\tau}$$

Clearly $C_x$ is always a positive number whenever there are more that one classes of APs.

Next, consider the following examples in view of the expressions immediately above.

EXAMPLE 1

Consider a situation where there are 4 APs each with 8 MIPS, and another AP with 32 MIPS. Assume 17 KBHCA (or thousands of busy hour call attempts) per 8 MIPS AP at 80% processor utilization (which is a reasonable number) and a cut off time of 0.85 seconds. In this case, $C_x$ would be 3/0.85=3.53 calls/second or 12.71 KBHCA. This number as a percentage of the overall capacity of (4×17+4×17)=85 KBHCA is about 15%.

EXAMPLE 2

Consider a situation where there are 2 APs with 8 MIPS and another AP with 16 MIPS. Assume 17 KBHCA per 8 MIPS APS at 80% processor utilization and cut off time is about 1 seconds. In this case, $C_x$ would be 1×1/1=1 calls/second or 3.6 KBHCA. As percentage this would be about 360/68=5.3%. Note that in this case, the faster CPU belongs to the same generation as the slower one, never the less demonstrates the utility of the method QR.

EXAMPLE 3

Consider a situation where there are 1 AP with 8 MIPS and another with 32 MIPS. With 17 K BHCA per 8 MIPS AP at 80% processor utilization and a cut off time of 1 second, $C_x$ would be 3/1=3 calls/second or 10.8 KBHCA. As percentage this would be about 1080/85=13%.

EXAMPLE 4

Consider a situation where there are 1 AP with 8 MIPS and another with 80 MIPS. With 17 KBHCA per 8 MIPS AP at 80% processor utilization and a cut off time of 1 second, $C_x$ would be 9/1=9 calls/second or 32.4 KBHCA. As percentage this would be about 3240/187=17%.

It can be observed that the percentage of calls method QR can process beyond what can be achieved by the utilization equalization method depends upon the response time cut off. The smaller the response time cut off, the larger will be the percentage of extra calls the method QR will let the system 300 with diverse performance APs 310–320 handle. The extra calls successfully processed comes from faster processors that can provide acceptable response at much higher utilization than the slower processors.

Figure 6:
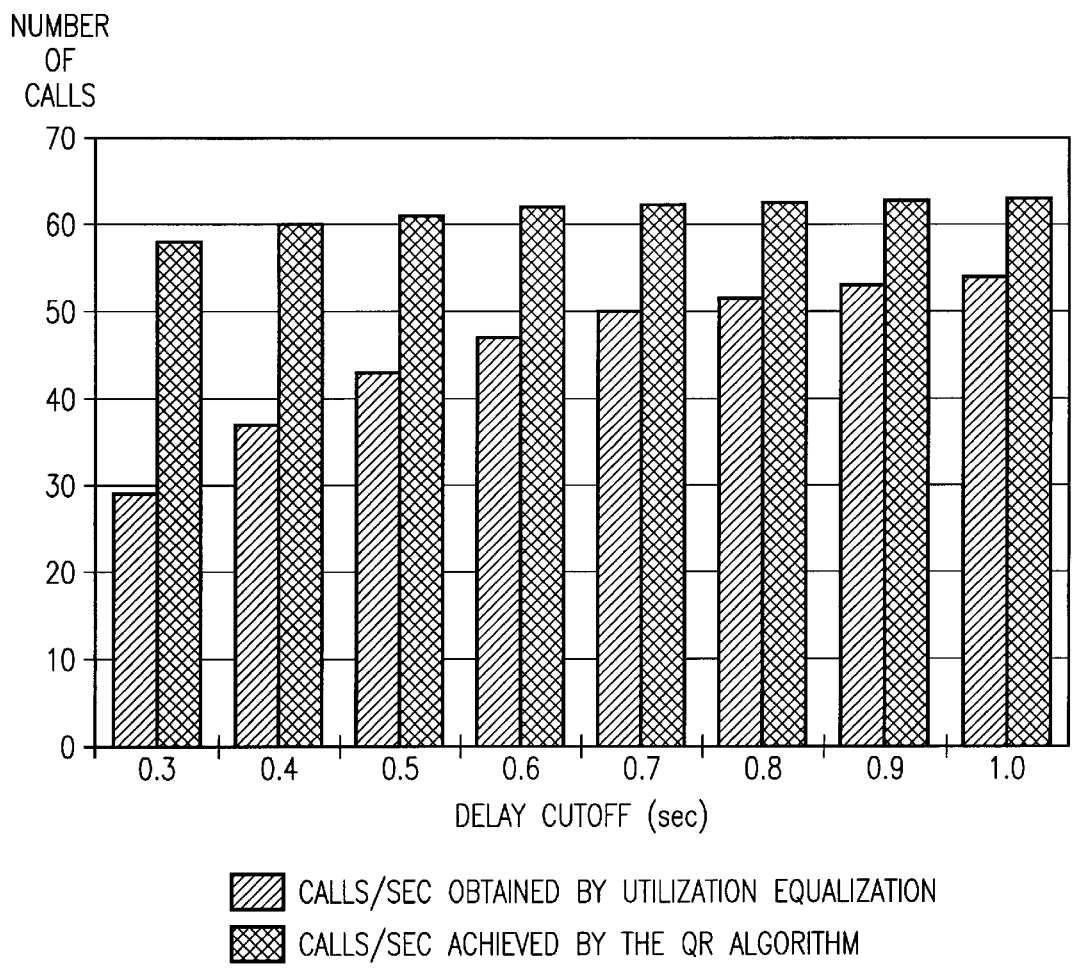
FIG. 6 is a bar chart of a comparison of utilization equalization and QR method on a simple system.

FIG. 6 shows a comparison of the two methods on a system consisting of 2 APs one with 8 MIPS and another with 80 MIPS. The X-axis here is the delay cutoff in seconds and Y-AXIS represents the number of calls processed by the two methods. As one can see, the new method has significant advantage over the utilization equalization method particularly when the delays required are smaller which is what the customers would prefer.

In summary, the method QR definitely provides greater call processing during busy hour than the AP utilization equalization method for systems with APs with different performance characteristics. Further, systems with diverse APs are realities that modem networks because such networks to protect prior equipment investments. With the existing known methods that focus on processor occupancy equalization, faster processors will be underutilized and system capacity will suffer since it allows for the possibility of the handicap of the lowest speed AP dictate the under utilization of faster APs and forced load shed by high speed APs.

An implementation of the method QR is straightforward. Instead of computing the utilization of all APs, expected response time for APs needs to be computed when a new call arrives. The method QR assigns the call to an AP that has the least expected response time. The method QR will also lead to slightly faster response to CP at light and medium loads as faster APs share bulk of the calls. Method QR focuses on each call request in real time, seeks a fastest responding AP to work on it if it has a promise of completing the call successfully and turns it down if the fastest responding AP can not respond to it within the response time needed. At this instant, the system 300 or 400 is truly in an overload situation and turning the call down is unavoidable.

Thus, it will now be understood that there has been disclosed a new apparatus and method for assigning one of multiple diverse application processors to process a call request. Those skilled in the art will recognize that other modifications and variations of the present invention are possible, for example, periodic updates to the CPU utilization vector by actual measured numbers from the APs could be used instead of statistical calculated utilization. A second example has n-1 network switches connected to the ATMs via OC-3s or similar links to increase the connectivity. Another variation would require the response time updating to be done by each AP independently and periodically share the same with the AAP. These updates can then be used to constantly validate and update the model and also in the call assignment. This approach however will incur additional communication and processing overheads at AAP and APs. With APs with high speed interconnects that have broadcasting capability, as in an OC-3 ATM interconnect or high speed token ring, this can be achieved. It is intended that the appended claims cover all such variations and modifications that are within their scope and spirit.

What is claimed is:

1. In an automatic call distribution system having a plurality of diverse application call processors, a method for directed call control scheduling comprising the steps of:

a. determining if a call request is present and if there is not a call request present repeating step a, otherwise continuing to step b;

b. determining if one of said application call processors has been assigned to the call request and if an application call processor has been assigned to the call request then continuing to step c, otherwise proceeding to step d;

c. terminating the call request, updating application call processor utilization data table entries and returning to step a;

d. using a computed response time data T(i) for i=1 to N for each of the 1 to N application call processors of class i with performance data of S(i) for i=1 to N of each of the 1 to N application call processors in class i and utilization data U(i) for i=1 to N to find one application call processor that has a minimum response time T(j) of the j-th application call processor of the plurality of application processors to fulfill the call request;

e. determining if the minimum response time T(j) is greater than maximum allowable response time τ and if the minimum response time T(j) is greater than maximum allowable response time τ continuing to step f, otherwise proceeding to step g;

f. shedding said call request and returning to step a;

g. updating expected utilization of U(j) of the j-th application processor for call processing and assigning said call request to the j-th application processor for call processing; and h. returning to step a.

2. The method of claim 1, wherein said updating of application call processor utilization table entries comprises updating entries for U(j)=U(j)−S(j)/p;
where the first U(j) is the updated utilization of the j-th application processor, the second U(j) is the utilization previous to the update, S(j) is the performance of the j-th application call processor, and p is the mean length of each call.

3. The method of claim 1, wherein said computed response time T(i) for each of the N application call processors is computed by the following C language program

```
j=1
For i=1 to N do begin
T(i)=S(i)/(1−U(i)−S(i)/p;
If T(i)<T(j) then do j=i;
End.
```

4. The method of claim 1 wherein the updating of utilization U(j) is according to the C language expression U(j)=U(j)+S(j)/p; where the first U(j) is the updated utilization of the j-th application processor, the second U(j) is the utilization previous to the update, S(j) is the performance of the j-th application call processor, and p is the mean length of each call.

5. In an automatic call distribution system having a plurality of diverse application call processors, an apparatus for directed call control scheduling comprising:

means for determining if a call request is present;

means for determining if one of said application call processors has been assigned to the call request and if an application processor has not been assigned to the call request then using a computed response time data T(i) for i=1 to N of N application call processors with performance data of S(i) for i=1 to N and utilization data U(i) for i=1 to N finding one application call processor that has a minimum response time T(j) of the j-th application call processor of the plurality of application call processors to fulfill the call request; and means for determining if the response time T(j) is greater than maximum allowable response time τ and if the response time T(j) is greater than maximum allowable response time τ shedding said call request and if the response time T(j) is not greater than maximum allowable response time τ updating an expected utilization of U(j) of the j-th application processor for call processing and assigning said call request to the j-th application processor for call processing.

6. The apparatus of claim 5, wherein all of the means are provided by an administrative application processor executing a program that includes a method for assigning an application processor of the plurality of diverse processors that is able to respond to a call request in the fastest time.

7. The apparatus of claim 6, wherein the administrative application processor is provided by a portion of each application processor.

8. In an automatic call distribution system having a plurality of N diverse application call processors, a method for directed call control scheduling comprising the steps of:

a. determining if a call request is present and if there is not a call request present repeating step a, otherwise continuing to step b;

b. determining if one of said application call processors has been assigned to the call request and if an application call processor has been assigned to the call request then continuing to step c, otherwise proceeding to step d;

c. terminating the call request, updating application call processor utilization data table entries and returning to step a;

d. using a computed response time for each of the N application call processors, performance data of each of the N application call processors and utilization data for each of the N application call processors to find one application call processor that has a minimum response time of the plurality of N application call processors to fulfill the call request;

e. determining if the minimum response time found in step d is greater than maximum allowable response time and if the minimum response time found is greater than maximum allowable response time continuing to step f, otherwise proceeding to step g;

f. shedding said call request and returning to step a;

g. updating expected utilization of the application call processor found in step d to have the minimum response time and assigning said call request to that application call processor for call processing; and h. returning to step a.

* * * * *